US009813124B2

United States Patent
Tsai et al.

(10) Patent No.: US 9,813,124 B2
(45) Date of Patent: Nov. 7, 2017

(54) METHODS FOR CODEWORD LEVEL INTERFERENCE CANCELLATION WITH NETWORK ASSISTANCE

(71) Applicant: MEDIATEK INC., Hsinchu (TW)

(72) Inventors: Lung-Sheng Tsai, Tainan (TW); Xiangyang Zhuang, Lake Zurich, IL (US); Pei-Kai Liao, Nantou County (TW)

(73) Assignee: MEDIATEK INC., Hsinchu (TW)

( * ) Notice: Subject to any disclaimer, the term of this patent is extended or adjusted under 35 U.S.C. 154(b) by 248 days.

(21) Appl. No.: 14/555,271

(22) Filed: Nov. 26, 2014

(65) Prior Publication Data
US 2015/0146657 A1    May 28, 2015

Related U.S. Application Data

(60) Provisional application No. 61/909,494, filed on Nov. 27, 2013.

(51) Int. Cl.
*H04B 7/0452* (2017.01)
*H04B 1/10* (2006.01)
(Continued)

(52) U.S. Cl.
CPC ......... *H04B 7/0452* (2013.01); *H04B 1/1027* (2013.01); *H04B 7/0617* (2013.01);
(Continued)

(58) Field of Classification Search
CPC .. H04B 1/1027; H04B 7/0452; H04B 7/0617; H04B 7/0619; H04J 11/004;
(Continued)

(56) References Cited

U.S. PATENT DOCUMENTS 7,885,604 B2    2/2011 Wee et al. ..................... 455/63.1
8,913,530 B2    12/2014 Dimou et al. ................. 370/280
(Continued)

FOREIGN PATENT DOCUMENTS

CN    101500179 A    8/2009
CN    102076098 A    5/2011
(Continued)

OTHER PUBLICATIONS

U.S., Office Action for related U.S. Appl. No. 14/555,226 dated Mar. 15, 2016 (10 pages).
(Continued)

*Primary Examiner* — Alpus H Hsu
*Assistant Examiner* — Dharmesh Patel
(74) *Attorney, Agent, or Firm* — Imperium Patent Works; Zheng Jin

(57) ABSTRACT

A method for a receiver to cancel or suppress co-channel interference with network assistance is provided. The method comprises deriving a first set of parameters related to interfering signals in a mobile communication network; receiving a second set of parameters related to the interfering signals from the network; and cancelling the contribution of interfering signals from the received signal based on the combination of the first set and second set of parameters. In one embodiment, scrambling rules and resource block allocation information are signaled to the victim UE to facilitate Codeword-Level Interference Cancellation (CWIC). While the scrambling rule for control channel is based on UE-specific identity, the scrambling rule for data channel is based on cell-specific identity or other network-configurable identity to facilitate CWIC. In addition, RA-allocation information are signaled to the victim UE in an efficient way.

11 Claims, 5 Drawing Sheets

(51) Int. Cl.

| | | |
|---|---|---|
| *H04B 7/06* | (2006.01) | |
| *H04L 1/00* | (2006.01) | |
| *H04L 5/00* | (2006.01) | |
| *H04J 11/00* | (2006.01) | |
| *H04W 72/04* | (2009.01) | |
| *H04W 28/06* | (2009.01) | |
| *H04W 28/18* | (2009.01) | |

(52) U.S. Cl.
CPC .......... *H04B 7/0619* (2013.01); *H04J 11/004* (2013.01); *H04J 11/005* (2013.01); *H04L 1/00* (2013.01); *H04L 5/0048* (2013.01); *H04L 5/0073* (2013.01); *H04L 5/005* (2013.01); *H04W 28/06* (2013.01); *H04W 28/18* (2013.01); *H04W 72/042* (2013.01)

(58) Field of Classification Search
CPC ........ H04J 11/005; H04L 1/00; H04L 1/0003; H04L 1/005; H04L 1/0048; H04L 1/0073; H04L 1/0606; H04W 28/06; H04W 28/18; H04W 72/042; H04W 72/082; H04W 76/046
See application file for complete search history.

(56) References Cited

U.S. PATENT DOCUMENTS

| | | | |
|---|---|---|---|
| 8,934,326 B2 | 1/2015 | Bhattad et al. | 370/201 |
| 8,964,871 B2 | 2/2015 | Mobasher et al. | 375/267 |
| 2009/0190641 A1 | 7/2009 | Yang | 375/224 |
| 2010/0309861 A1* | 12/2010 | Gorokhov | H04B 1/7103 370/329 |
| 2011/0228732 A1 | 9/2011 | Luo et al. | 370/329 |
| 2011/0261673 A1 | 10/2011 | Luo et al. | 370/201 |
| 2013/0017823 A1* | 1/2013 | Mao | H04W 36/04 455/424 |
| 2013/0044697 A1 | 2/2013 | Yoo et al. | 370/329 |
| 2013/0114437 A1 | 5/2013 | Yoo et al. | 370/252 |
| 2013/0114438 A1* | 5/2013 | Bhattad | H04J 11/005 370/252 |
| 2013/0115987 A1 | 5/2013 | Yoo et al. | 455/501 |
| 2013/0170533 A1 | 7/2013 | Khojastepour et al. | 375/227 |
| 2013/0265951 A1 | 10/2013 | Ng et al. | 370/329 |
| 2014/0098773 A1 | 4/2014 | Yoo et al. | 370/329 |
| 2014/0146775 A1 | 5/2014 | Guan et al. | 370/329 |
| 2014/0153499 A1* | 6/2014 | Wang | H04W 24/02 370/329 |
| 2014/0241276 A1 | 8/2014 | Berberana et al. | 370/329 |
| 2014/0301268 A1 | 10/2014 | Xu et al. | 370/312 |
| 2014/0307569 A1 | 10/2014 | Barbieri et al. | 370/252 |
| 2015/0036621 A1 | 2/2015 | Shin | 370/329 |

FOREIGN PATENT DOCUMENTS

| | | |
|---|---|---|
| WO | WO201302505 A1 | 2/2013 |
| WO | WO2013026643 A1 | 2/2013 |
| WO | WO2013133747 A2 | 9/2013 |

OTHER PUBLICATIONS

International Search Report and Written Opinion of International Search Authority for PCT/CN2014/092371 dated Mar. 3, 2015(12 pages).
International Search Report and Written Opinion of International Search Authority for PCT/CN2014/092370 dated Mar. 4, 2015(12 pages).
3GPP TR 36.866 V1.0.0 (Nov. 2013); 3rd Generation Partnership Project; Technical Specification Group radio access Network; Network-assisted Interference Cancellation and Suppression for LTE (Release 12).
EPO, Search Report for the EP patent application 14865547.5 dated Jan. 9, 2017 (8 pages).
3GPP TSG RAN1 #75 R1-135238, Samsung, Discussion on Possible Specification Impacts for NAICS, San Francisco, USA dated Nov. 11-15, 2013 (4 pages).
SIPO, Search Report for the CN patent application 201480062239.X (no English translation is available) dated Mar. 24, 2017 (8 pages).

* cited by examiner

METHODS FOR CODEWORD LEVEL INTERFERENCE CANCELLATION WITH NETWORK ASSISTANCE

CROSS REFERENCE TO RELATED APPLICATIONS

This application claims priority under 35 U.S.C. §119 from U.S. Provisional Application No. 61/909,494, entitled "Methods for Interference Cancellation/Suppression with Network Assistance," filed on Nov. 27, 2013, the subject matter of which is incorporated herein by reference.

TECHNICAL FIELD

The disclosed embodiments relate generally to mobile communication networks, and, more particularly, to methods for interference cancellation/suppression with network assistance.

BACKGROUND

Long Term Evolution (LTE) is an improved universal mobile telecommunication system (UMTS) that provides higher data rate, lower latency and improved system capacity. In LTE systems, an evolved universal terrestrial radio access network includes a plurality of base stations, referred as evolved Node-Bs (eNBs), communicating with a plurality of mobile stations, referred as user equipment (UE). A UE may communicate with a base station or an eNB via the downlink and uplink. The downlink (DL) refers to the communication from the base station to the UE. The uplink (UL) refers to the communication from the UE to the base station. LTE is commonly marketed as 4G LTE, and the LTE standard is developed by 3GPP.

Starting from April 2013, 3GPP started a new study item (SI), "Network Assisted Interference Cancellation and Suppression" (NAICS), to investigate the benefit on system throughput by leveraging receiver's capability of interference cancellation. Various types of interference cancellation (IC) receivers are shown to provide significant gain if some characteristics of interference are available at victim nodes. Commonly investigated IC techniques in literature may include symbol-level based IC (SLIC) and codeword-level IC (CWIC). SLIC is an IC technique that detects interfering signal, which is supposed to be finite-constellation modulated, in a per-symbol basis. CWIC is referred to that a receiver decodes and re-encodes interference codeword to reconstruct the contribution of the interference signal on its received signal. Comparing to SLIC, a receiver needs more information on interference to access CWIC, such as modulation and coding scheme (MCS) index and the rule scrambling the bit stream of interference. Obtaining the interference characteristics, such as the modulation order or encoding rules of the interfering signal, is important for IC techniques. The characteristics could be either blindly detected by victim receiver or informed from network side.

In the NAICS study item, various parameter candidates helpful for interference cancellation were identified. For example, parameters that are higher-layer configured per the current specifications (e.g., transmission mode, cell ID, MBSFN subframes, CRS antenna ports, $P_A$, $P_B$); parameters that are dynamically signaled per the current specifications (e.g., CFI, PMI, RI, MCS, resource allocation, DMRS ports, $n_{ID}^{DMRS}$ used in TM10); and other deployment related parameters (e.g., synchronization, CP, subframe/slot alignment). Although it is possible to let receiver detect or estimate these parameters associated with the interfering signal without any aid of signaling, the complexity cost could be very huge to estimate them. The current LTE system provides sufficient signaling and reference signals supporting the channel estimation only for desired-signal link, but not for interference link. Solutions to obtain the characteristics of interference or enhance the reliability to estimate these parameters are sought.

SUMMARY

A method for a receiver to cancel or suppress co-channel interference with network assistance is proposed. The method comprises deriving a first set of parameters related to interfering signals in a mobile communication network; receiving a second set of parameters related to the interfering signals from the network; and cancelling the contribution of interfering signals from the received signal based on the combination of the first set and second set of parameters.

In one embodiment, the interfering signals comprise intra-cell interfering signals and/or inter-cell interfering signals. While inter-cell interference comes from neighboring cells, intra-cell interference comes from MU-MIMO transmission to other users in the same serving cell as the victim UE. In one example, the serving base station not only signals information to the victim UE for inter-cell interference, but also for intra-cell interference due to MU-MIMO transmission.

In another embodiment, scrambling rules and resource block allocation information are signaled to the victim UE to facilitate Codeword-Level Interference Cancellation (CWIC). While the scrambling rule for control channel is based on UE-specific identity, the scrambling rule for data channel is based on cell-specific identity or other network-configurable identity to facilitate CWIC. In addition, RA-allocation information are signaled to the victim UE in an efficient way.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
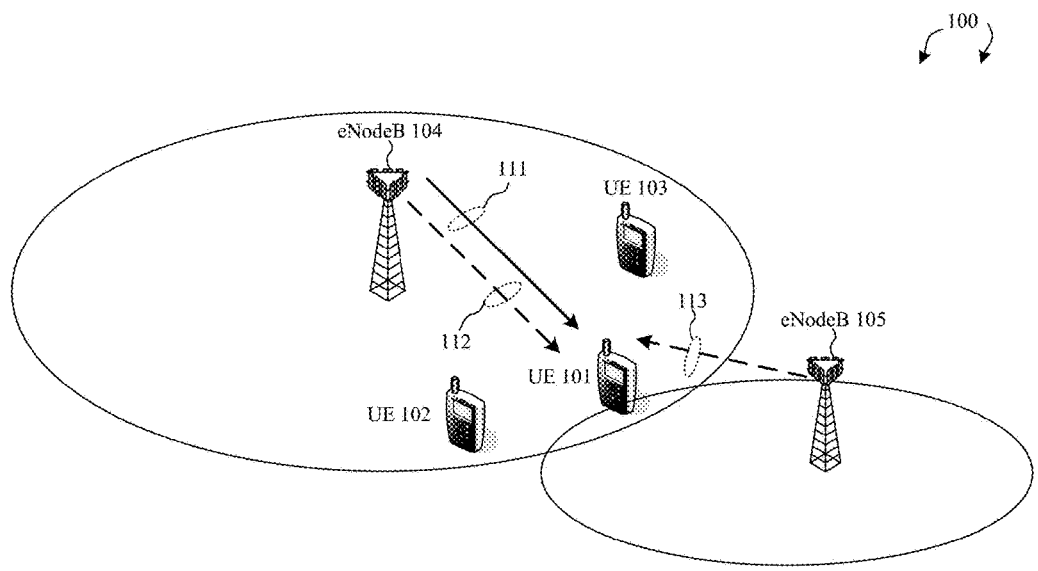
FIG. 1 illustrates a mobile communication network with interference cancellation for both inter-cell interference and intra-cell interference in accordance with one novel aspect.

FIG. 1 illustrates a mobile communication network 100 with interference cancellation for both inter-cell interference and intra-cell interference in accordance with one novel aspect. Mobile communication network 100 is an OFDM network comprising a plurality of user equipments UE 101, UE 102, and UE 103, a serving base station eNB 104, and a neighbor base station eNB 105. In 3GPP LTE system based on OFDMA downlink, the radio resource is partitioned into subframes in time domain, each subframe is comprised of two slots and each slot has seven OFDMA symbols in the case of normal Cyclic Prefix (CP), or six OFDMA symbols in the case of extended CP. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. Resource elements are grouped into resource blocks, where each resource block (RB) consists of 12 consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in LTE, while the Physical Downlink Control Channel (PDCCH) is used to carry downlink control information (DCI) in LTE. The control information may include scheduling decision, information related to reference signal information, rules forming the corresponding transport block (TB) to be carried by PDSCH, and power control command. For reference signals, Cell-specific reference signals (CRS) are utilized by UEs for the demodulation of control/data channels in non-precoded or codebook-based precoded transmission modes, radio link monitoring and measurements of channel state information (CSI) feedback. UE-specific reference signals (DM-RS) are utilized by UEs for the demodulation of control/data channels in non-codebook-based precoded transmission modes.

In addition to the downlink channels, multi-user multiple-input multiple-output (MU-MIMO) transmission is becoming a new system technique to enable high system capacity in LTE networks. The base station should apply transmit beamforming (precoding), computed from channel information acquired in the MU-MIMO downlink channel sounding and feedback to achieve an orthogonal (or near-orthogonal) transmission of multiple streams to multiple users, i.e., eliminating (or reducing) the amount of mutual interference between the transmission to multiple mobile stations. Under this condition, each mobile station only receives the spatial stream(s) intended for itself and not the interference from the spatial stream(s) intended for other mobile stations.

In the example of FIG. 1, UE 101 is served by its serving base station eNB 104. UE 101 receives desired radio signal 111 transmitted from eNB 104. However, UE 101 also receives interfering radio signals. In one example, UE 101 receives intra-cell interfering radio signal 112 transmitted from the same serving eNB 104. Typically, such intra-cell interference is due to MU-MIMO transmission intended for other UEs (e.g., UE 102 and UE 103) in the same serving cell. In another example, UE 101 receives inter-cell interfering radio signal 113 transmitted from neighbor base station eNB 105. UE 101 may be equipped with an interference cancellation (IC) receiver that is capable of cancelling the contribution of the interfering signals from the desired signals.

In the "Network Assisted Interference Cancellation and Suppression" (NAICS) study item, various parameter candidates helpful for interference cancellation were identified. For example, parameters that are higher-layer configured per the current specifications (e.g., transmission mode, cell ID, MBSFN subframes, CRS antenna ports, $P_A$, $P_B$); parameters that are dynamically signaled per the current specifications (e.g., CFI, PMI, RI, MCS, resource allocation, DMRS ports, $n_{ID}^{DMRS}$ used in TM10); and other deployment related parameters (e.g., synchronization, CP, subframe/slot alignment). Although it is possible to let receiver detect or estimate these parameters associated with the interfering signal without any aid of signaling, the complexity cost could be very huge to estimate them. Furthermore, since interference characteristic may change for every PRB/subframe, dynamic signaling all the parameters is not feasible.

In accordance with one novel aspect, signaling methods to support robust interference cancellation by obtaining information associated with interfering signals from the network side and the way to use the assistant signaling are provided. The target interference for cancellation could be inter-cell interference from neighboring cells or intra-cell interference from MU-MIMO transmission. The target receiver types include both symbol-level IC (SLIC) and codeword-level IC (CWIC) receivers. The signaling methods mainly comprise 1) what parameters to be signaled, 2) how to signal a parameter (format of signaling), and 3) constraints and restriction at transmitter side.

Figure 2:
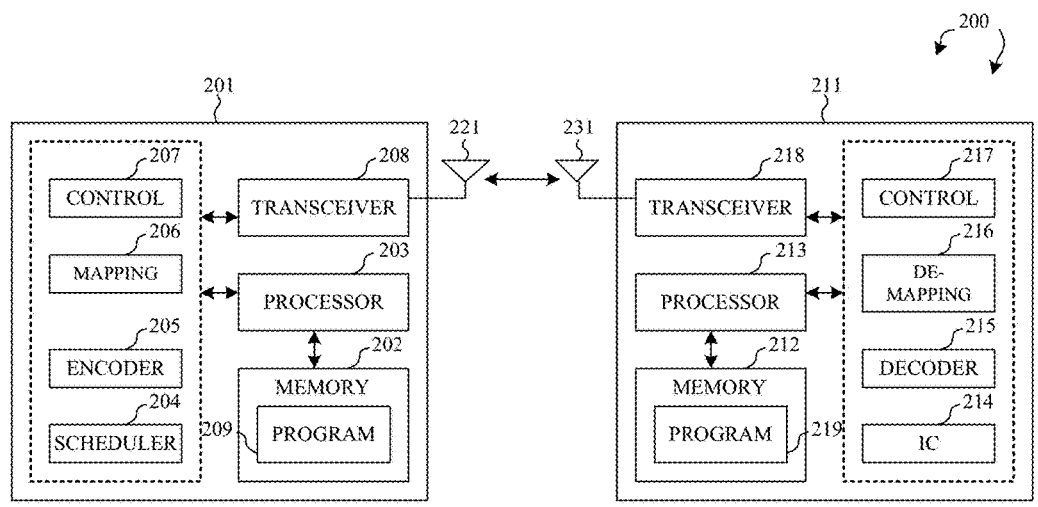
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE.

Base station 201 and UE 211 also include several functional modules to carry out some embodiments of the present invention. The different functional modules can be configured and implemented by software, firmware, hardware, or any combination thereof. The function modules, when executed by the processors 203 and 213 (e.g., via executing program codes 209 and 219), for example, allow base station 201 to schedule (via scheduler 204), encode (via encoder 205), mapping (via mapping module 206), and transmit control information and data (via control module 207) to UE 211, and allow UE 211 to receive, de-mapping (via de-mapper 216), and decode (via decoder 215) the control information and data (via control module 217) accordingly with interference cancellation capability. In one example, base station 201 provides assistant information that include parameters related to interfering signals to UE 211. Upon receiving the related parameters, UE 211 is then able to perform interference cancellation via IC module 214 to cancel the contribution of the interfering signals accordingly.

Interference Cancellation with Network Assistance

Figure 3:
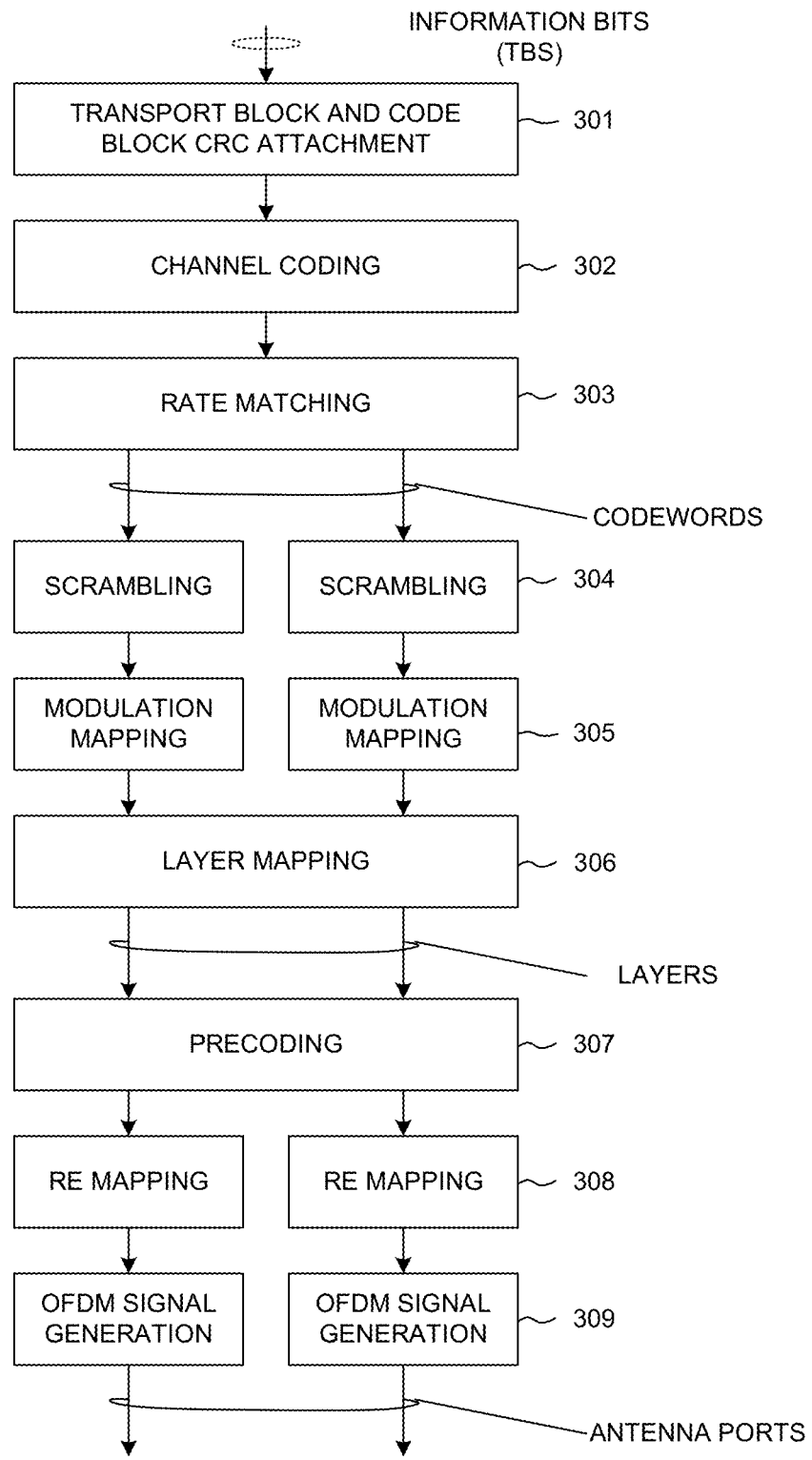
FIG. 3 illustrates functional blocks in a communication system that maps information bits of a transport block to codewords and then maps to baseband signals for transmission.

FIG. 3 illustrates functional blocks of a transmitting device in a communication system that map information bits of a transport block (TB) to codewords and then map to baseband signals for transmission. In step 301, the information bits are arranged into transport blocks (TBs) and attached with CRC. In addition, the TBs are segmented into code blocks and attached with CRC. In step 302, channel coding (forward error correction such as Turbo coding) is performed with certain code rate. In step 303, rate matching is performed, which creates an output with a desired code rate, and where the TBs are mapped into codewords. In step 304, the codewords are scrambled based on predefined scrambling rule (e.g., scramble with a corresponding Radio Network Temporary Identifier (RNTI) of the UE). In step 305, modulation mapping is performed, where the codewords are modulated based on various modulation orders (e.g., PSK, QAM) to create complex-valued modulation symbols. In step 306, layer mapping is performed, where the complex-valued symbols are mapped onto different MIMO layers depending on the number of transmit antenna used. In step 307, precoding is performed with certain precoding matrix index (PMI) for each antenna port. In step 308, the complex-valued symbols for each antenna are mapped onto corresponding resource elements (REs) of physical resource blocks (PRBs). Finally, in step 309, OFDM signals are generated for baseband signal transmission via antenna ports.

The mapping rules in these functional blocks should be known for a receiving device to receive the transport blocks. A UE receives information-bearing signal propagating though wire channel or wireless channel and processes it to recover the transport block. For the UE to receive TBs carried by PDSCH, it first needs to know the DCI carried by PDCCH associated with these transport blocks. The DCI indicates the rules that map the information bits of each TB to the modulated symbols carried on PDSCH, the RB-allocation for the encoded and modulated symbols of the transport blocks, information related to the reference signals used for channel estimation, and power control commands. UE decodes the TBs based on received control information and the configured parameters provided by network.

While the UE receives and decodes the information bits from the desired radio signals, the UE also receives undesired interfering radio signals. The UE thus needs to cancel the contribution of the interfering signals from the desired signals. To improve the receiving performance through interference cancellation techniques, the key components that a receiver needs to know or to estimate may include all or some of the following components: C1) Channel state information between the interfering source and the victim receiver; C2) resource block (RB) assignment of the interfering signal; and C3) modulation order (MOD) of the interfering signal.

Obtaining channel state information relies on the received reference signals and may need the aid of signaling to know the used precoder. For PDSCH transmission, the transmission mode could be either CRS-based or DMRS-based. For CRS-based transmission mode, the precoder used by PDSCH is signaled to receiver through control channel. The precoder information cannot be extracted from the received cell-specific reference signals. On the other hand, for DMRS-based transmission mode, precoding is also applied on DMRS. Receiver directly estimates the compound channel formed by propagation channel and the used precoding vector/matrix for further processing.

While the victim receiver is supposed to know the complete control information for its own PDSCH signal through RRC and PDCCH from its serving eNB, the components listed above associated with interference signal are generally unknown to the victim receiver. Without further signaling, the receiver can still estimate the components above for co-channel interference on a per-RB basis. Nevertheless, such uncertainty degrades the performance of IC. An efficient way to signal information about these components of interference would reduce the receiver's complexity to estimate/detect interference information and help the receiver to provide better performance resulting from IC gain.

Figure 4:
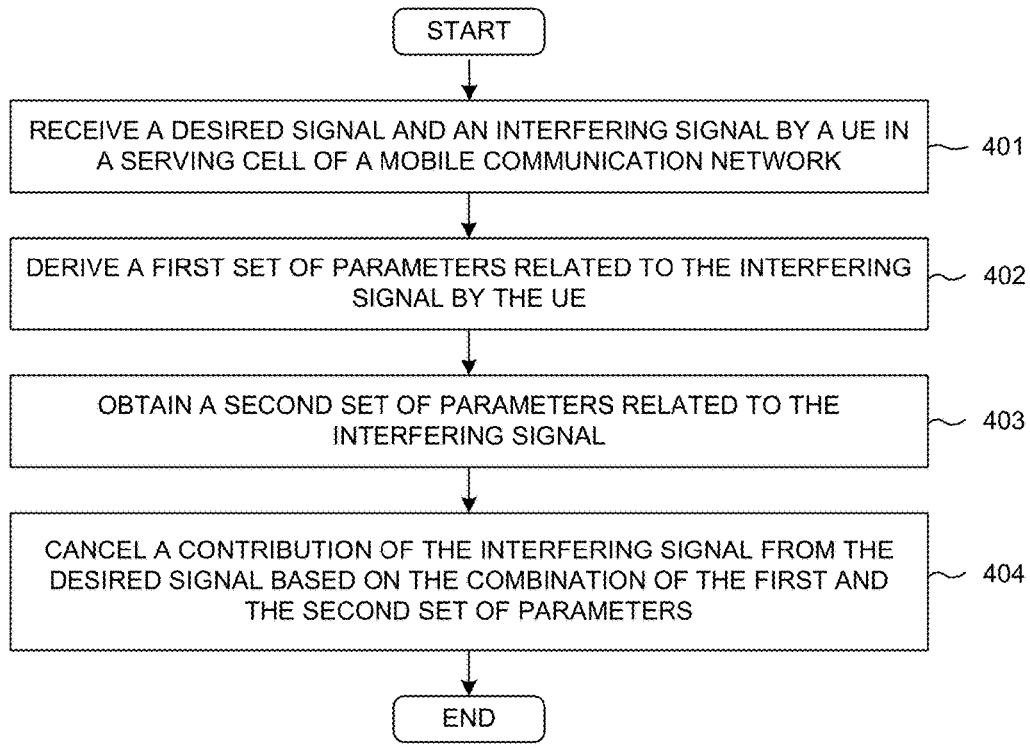
FIG. 4 is a flow chart of a method of interference cancellation from UE perspective in accordance with one novel aspect.

FIG. 4 is a flow chart of a method of interference cancellation from UE perspective in accordance with one novel aspect. In step 401, a user equipment (UE) receives a desired radio signal and an interfering radio signal in a serving cell of a mobile communication network. The interfering signal could be either intra-cell interference or inter-cell interference. In step 402, the UE derives a first set of parameters related to the interfering signal. For example, the UE may blindly detect some of the parameters related to the interfering signal by UE's receiver without any signaling. In step 403, the UE obtains a second set of parameters related to the interfering signal. The purpose is for UE's receiver to obtain additional parameters related to the interfering signal to improve the interference cancellation (IC) quality.

For example, the parameters may comprise predefined rules to generate the reference signal associated with the interfering signal. The rules may indicate exactly how to generate the reference signal associated with the interfering signal, or indicate multiple candidates of how to generate the reference signal associated with the interfering signal. The UE is then able to estimate the interfering channel using the reference signal. The parameters may further comprise scheduling information of the interfering signal. The scheduling information may comprise a modulation order, a coding rate, precoding information, a mapping rule that indicates how precoded symbols map to physical REs, a scrambling rule, power information, and resource allocation information of the interfering signal. In step 404, the UE cancels a contribution of the interfering signal from the desired signal base on the combination of the first set and the second set of parameters.

Figure 5:
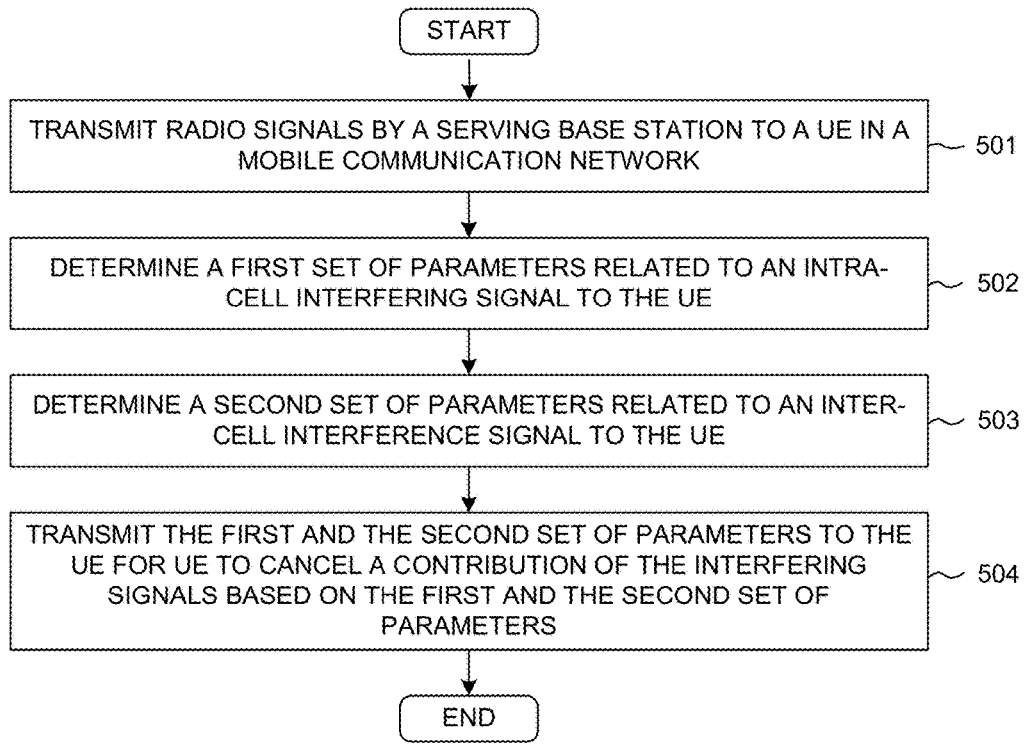
FIG. 5 is a flow chart of a method of interference cancellation from eNB perspective in accordance with one novel aspect.

FIG. 5 is a flow chart of a method of interference cancellation from eNB perspective in accordance with one novel aspect. In step 501, a serving base station (eNB) transmits radio signals to a user equipment (UE) in a mobile communication network. In step 502, the eNB determines a first set of parameters related to an intra-cell interfering signal to the UE. For example, the intra-cell interfering signal is due to MU-MIMO transmission from the serving eNB to other users served in the same cell. In step 503, the eNB determines a second set of parameters related to an inter-cell interfering signal to the UE. For example, the inter-cell interfering signal is due to transmission from neighboring cells. In step 504, the eNB transmits the first and the second set of parameters to the UE for the UE to cancel a contribution of the interfering signals based on the first set and the second set of parameters.

The MOD of co-channel interference may either be signaled to the victim UE by an implicit way or be explicitly signaled. An example of implicit way is to let the scheduler follow a rule that limits the MOD of co-channel users to be with low constellation size, e.g., QPSK. This is based on the consideration that low-dimensional constellation is more likely to be correctly detected compared to high-ordered constellation. Based on the same consideration above, another approach with reduced overhead is to signal the victim UE whether a co-channel interfering signal is modulated by a low-dimensional constellation or not.

Precoding information associated with the target interfering signal for IC can be signaled to the victim UE. In CRS-based TMs, it is helpful for UE to have the precoder information that cannot be estimated from CRS. To reduce the overhead, instead of explicitly signaling the precoder used by interference, it is possible to just signal a subset of precoder candidates from codebook and then rely on UE's capability to further detect which precoder is indeed used by interference. Another alternative is to predefine a subset of precoders, constrain the precoder used by an interference source to be within this subset, and then signal which precoder is used by the interference source. The predefined subset also could be a function of the precoder used by the victim receiver. This is feasible for MU-MIMO transmission case because the other interfering co-channel MIMO user usually does not apply the same precoding weight as the one used by the victim receiver, and scheduler tends to pair co-channel MIMO users with orthogonal precoders. For example, there are 16 possible precoders indexed from 0 to 15 in the system for MU-MIMO precoding. Supposing that precoders 1, 2, 3, and 4 form a predefined subset of precoders associated with precoder 0 for MU-MIMO precoding. The serving eNB and the receiver both assume that when precoder 0 is used by one user, the co-channel users must apply the precoders within the subset of precoders 1, 2, 3, and 4. The overhead for the signaling of co-channel users' precoders and the uncertainty of detecting co-channel users' precoders decrease because of the reduced number of precoder candidates for co-channel users.

A victim receiver may estimate the inference channel with the aid of known pilot signals from co-channel interference. For example, if the signaled information is for the generation of DMRS pattern of interference, such information of reference signal is beneficial for (1) detection the existence of interference on each RB; and (2) estimation for the channel of interference. In this DMRS-based case, as already mentioned, the precoding information of inference is not necessary because DMRS is precoded by the same precoder applied on interference's PDSCH. If the signaled information is for the generation of CRS pattern of interference, it is helpful to estimate the interference channel, but not for the precoding information of interference. In this case, obtaining the precoding information may rely on further signaling or receiver's capability to detect it.

The network may not need to signal all necessary parameters to generate reference signal associated with inference, and UE can do some blind detection if some of the parameters are unknown. For example, the DMRS associated with co-channel interference may be initialized with the same cell signature for the victim receiver; or may be initialized with the cell signature associated with the interfering signal. UE may blindly guess the scrambling identity of DMRS, which is either 0 or 1, to detect the existence of such DMRS. Nevertheless, the most robust performance of course can be achieved if network signals all necessary information to generate reference signal associated with interference, at the cost of some signaling overhead.

Codeword-Level Interference Cancellation (CWIC)

For CWIC, all the issues encountered for SLIC, e.g., the unawareness of RB-allocation and MOD of the interfering signal, undoubtedly still exist. More challengingly, the receiver needs to know the mapping rules of how the transport-block is formed in order to reconstruct the contribution of interference.

Descrambling is one critical issue that a receiver would encounter when performing CWIC. As shown in FIG. 3, prior to modulation mapping of step 305, the transmitter scrambles the coded information bits for PDSCH with random bits generated by a scrambler. The scrambler shall be initialized at the start of each subframe, where the initialization value of $c_{init}$ depends on the transport channel type according to:

$$c_{init} = \begin{cases} n_{RNTI} \cdot 2^{14} + q \cdot 2^{13} + \lfloor n_s/2 \rfloor \cdot 2^9 + N_{ID}^{cell} & \text{for } PDSCH \\ \lfloor n_s/2 \rfloor \cdot 2^9 + N_{ID}^{MBSFN} & \text{for } PMCH \end{cases}$$

where $n_{RNTI}$ corresponds to the Radio Network Temporary Identifier (RNTI) associated with the PDSCH transmission, and it is only known by the receiver scheduled to receive this PDSCH.

A receiver has to descramble the demodulated signal before decoding and checking the CRC. While the RNTI associated with an interfering signal is not revealed to a victim UE, control information to decode/re-encode the TB associated with the interfering signal cannot be obtained by decoding the PDCCH associated with the interfering signal and has to be signaled to the victim UE by some means. Furthermore, in current specification there is no way to descramble other co-channel signal because the scrambling rule is associated with the RNTI of each UE. Due to heavy overhead of RNTI, signaling the RNTI of interference is impossible. Security is another concern since the DCI of the interfering UE would become solvable by others with known RNTI.

In accordance with one novel aspect of supporting CWIC, the scrambling rule for PDSCH becomes either (1) cell-specific; or (2) replace $n_{RNTI}$ by N, which may be one configured value, or multiple configurable values and then can be chosen by additional signaling. The key is the scrambling should not be a function of UE's RNTI. As a result, the protection for PDCCH is still preserved since RNTI is unknown to other receivers. The victim receiver then explicitly or implicitly receives the scrambling rule for the co-channel signals to be decoded/re-encoded. Based on the knowledge of scrambling rules for both desired signal and interfering signal, the victim receiver can perform CWIC accordingly.

Figure 6:
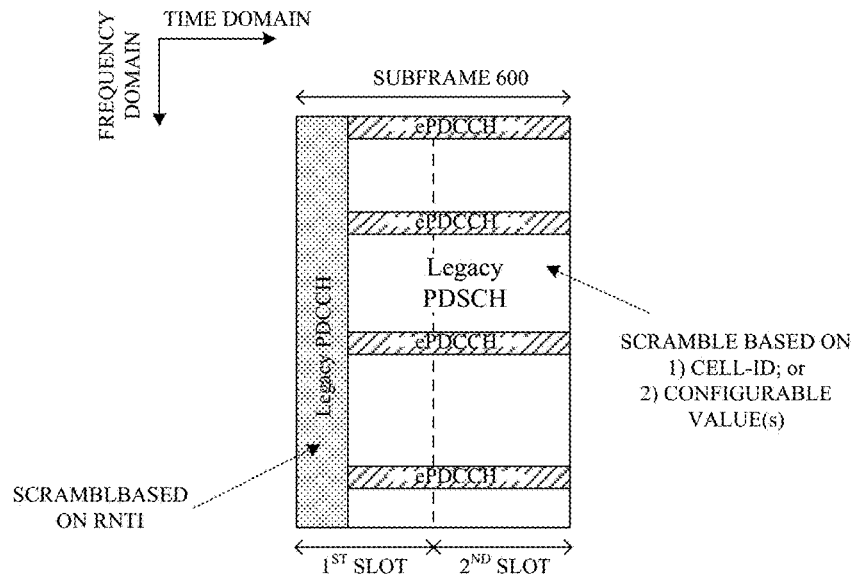
FIG. 6 illustrates the signaling of scrambling rules for supporting CWIC.

FIG. 6 illustrates the signaling of scrambling rules for supporting CWIC in a subframe 600 of a radio frame. As illustrated in FIG. 6, each subframe includes resource elements allocated for control channel (legacy PDCCH and ePDCCH) and data channel (legacy PDSCH). For control channel, the base station applies scrambling with each UE's RNTI for protection. For data channel, the base station applies scrambling with 1) cell-specific value (e.g., Cell-ID), or 2) configurable value(s) by the base station. For interference cancellation purpose, the base station can signal the scrambling rule of the interfering signal to the victim UE, and the victim UE can decode/re-encode accordingly.

Among all possible candidates that could help a receiver to have more information about interference, it is quite challenging to inform resource block allocation (RB-assignment) of interfering signal to a victim receiver due to large signaling overhead. Such information is helpful for a receiver to know the existence of interference. It is also helpful for MOD estimation because MOD is the same over all scheduled RBs of one transmission. Otherwise, MOD of interference is estimated for every subframe and every RB, or needs to be signaled additionally. Furthermore, with the knowledge of interfering user's RB-allocation, the feature of physical resource block bundling, which implies the same precoder is used for a predefined number of consecutive physical resource blocks, becomes applicable to better estimate the channel of interfering link for DMRS-based transmission modes.

There are two approaches to represent RB-assignment for PDSCH transmission. Approach-1 is a bitmap-based approach where each bit indicates whether each RB or each RB-group is assigned or not. Approach-2 is to signal the starting RB index (or the starting RB-group index) and the number of assigned contiguous RBs (or RB-groups). Approach-2 significantly reduces signaling overhead as compared to Approach 1 especially for large-bandwidth system, at the cost of limiting some the scheduling feasibility to maintain the contiguity of RB-allocation. However, even under Approach-2, additionally signaling for the RB-assignment of co-channel interference is still a heavy burden for control channel.

In accordance with one novel aspect, representation of the RB-assignment for interference is proposed. In general, it may not be necessary to signal the complete RB-assignment of the target interference to be cancelled. For SLIC, a receiver even does not care about interfering signals on the RBs not assigned to it. Furthermore, as discussed earlier, a receiver has some capability to detect the existence of co-channel interference, especially in DMRS-based transmission modes.

Various methods are proposed to further reduce the amount of signaling overhead of RB-assignment for interference. General concepts of the proposed methods are: 1) signaling the RBs that are interfered instead of signaling all RBs assigned for interference's TB; 2) leveraging UE's capability to reduce overhead; and 3) signaling under scheduling constraints. Each method comprises 1) The set of RBs to be signaled, denoted by S; 2) The format F to represent S; for example, it could be represented by either Approach-1 or Approach-2. For ease of the following demonstration, $S_V$ denotes the set of RBs allocated to victim UE and $S_{Ik}$ denotes the set of RBs allocated to interference source k.

Method 1: Signal the scheduling information of interfering signal when it can be represented in a compact way. The scheduler may follow a particular rule aligning the resource allocation for all co-channel users. For example, the eNB simply signals the victim UE whether $S_V \cap S_{Ik} = S_V$ holds or not. This approach would not induce too much overhead for signaling but limits the scheduling flexibility. Method 2: Signal the complete RB-allocation of interference: $S=S_I$. Method 3: signal the location of "interfered" RBs: $S=(S_V \cap S_I)$. Method 4: signal the superset containing all the interfered RBs and the superset is contiguous: $S \supseteq (S_V \cap S_I)$. This is an approach between fully signaling RB-allocation of interference and blindly detecting the existence of interfering signal. Because the set $S_V$ is known at the victim UE, UE can identify $(S_V \cap S_{Ik})$ by detecting the existence of interference k only at the RBs belonging to $(S \cap S_V)$. Method 5: signal the RB-allocation for some or all MOD candidates without specifying the interference contributor at each RB. For example, the receiver is signaled with the RB-allocation maps corresponding to QPSK, 16QAM, and 64QAM. Due to the different level of symbol-detection reliability, signaling only the maps corresponding to low-order modulation schemes can help to reduce signaling overhead without significant performance loss.

Figure 7:
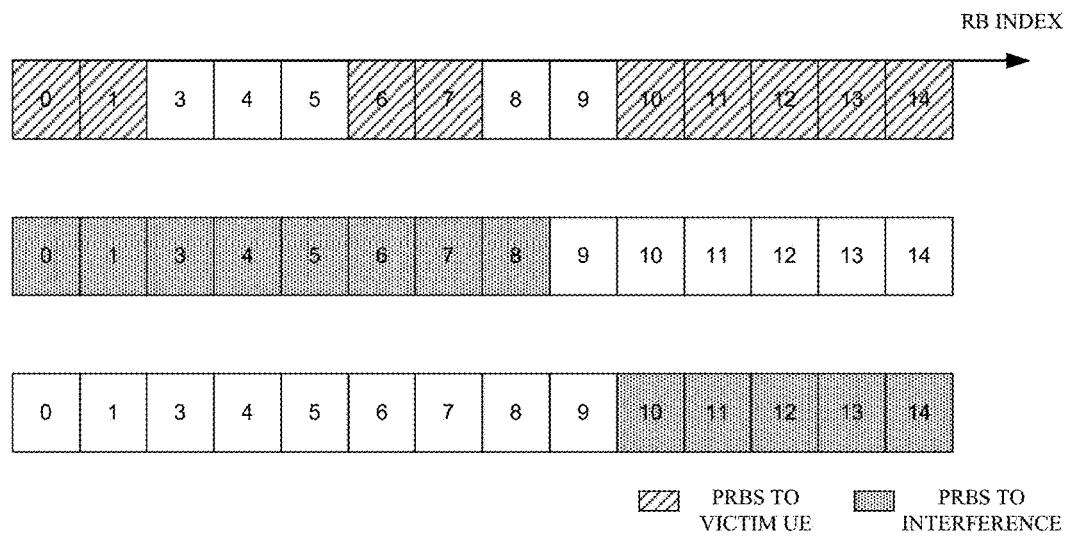
FIG. 7 illustrates the signaling of resource allocation for supporting CWIC.

FIG. 7 illustrates the signaling of resource allocation of RB-assignment for supporting CWIC. In the example of FIG. 7, $S_V=\{0, 1, 6, 7, 10, 11, 12, 13, 14\}$ denotes the set of RBs allocated to the victim UE, $S_{I1}=\{0, 1, 2, 3, 4, 5, 6, 7, 8\}$ denotes the set of RBs allocated for interference source 1, and $S_{I2}=\{10, 11, 12, 13, 14\}$ denotes the set of RBs allocated for interference source 2. In a first example, the serving base station signals $S=S_{Ik}$ for each interference source, e.g., signals $S=S_{I1}$ for interference source 1 and signals $S=S_{I2}$ for interference source 2. In a second example, the serving base station signals $S=(S_V \cap S_{Ik})$ for each interference source, e.g., signals $S=\{0, 1, 6, 7\}$ for interference source 1, and signals $S=\{10, 11, 12, 13, 14\}$ for interference source 2. In a third example, the serving base station signals the contiguous superset containing all the interfered RBs S $\supseteq (S_V \cap S_{Ik})$ for each interference source. For interference source 1, $(S_V \cap S_{I1})=\{0, 1, 6, 7\} \subseteq \{0, 1, \ldots 7\}$. Therefore, the eNB signals the contiguous RBs $S=\{0, 1, \ldots 7\}$ to the UE for interference source 1.

For the above-illustrated methods, the format representing the set S could be based on Approach-1 or Approach-2. It is also possible to choose a coarse RB-granularity for resource allocation to reduce signaling overhead. One possible choice for the coarse RB-granularity is the granularity of subband, which is defined for CSI feedback purpose. Furthermore, joint signaling for RB-allocation and other parameters may be applied. For example, the eNB may signal the RB-allocation for some or all MOD candidates without specifying the interference contributor (e.g., source) at each RB.

Referring back to FIG. 7, $S_V=\{0, 1, 6, 7, 10, 11, 12, 13, 14\}$ denotes the set of RBs allocated to the victim UE, $S_{I1}=\{0, 1, 2, 3, 4, 5, 6, 7, 8\}$ denotes the set of RBs allocated for interference source 1, and $S_{I2}=\{10, 11, 12, 13, 14\}$ denotes the set of RBs allocated for interference source 2. The allocated PRBs for both interference sources 1 and 2 are occupied with the same modulation order of QPSK. As a result, the serving eNB signals all the interfered PRBs with QPSK, i.e., $S=\{0, 1, 6, 7, 10, 11, 12, 13, 14\}$ to the UE without specifying the interference contributor at each RB.

Figure 8:
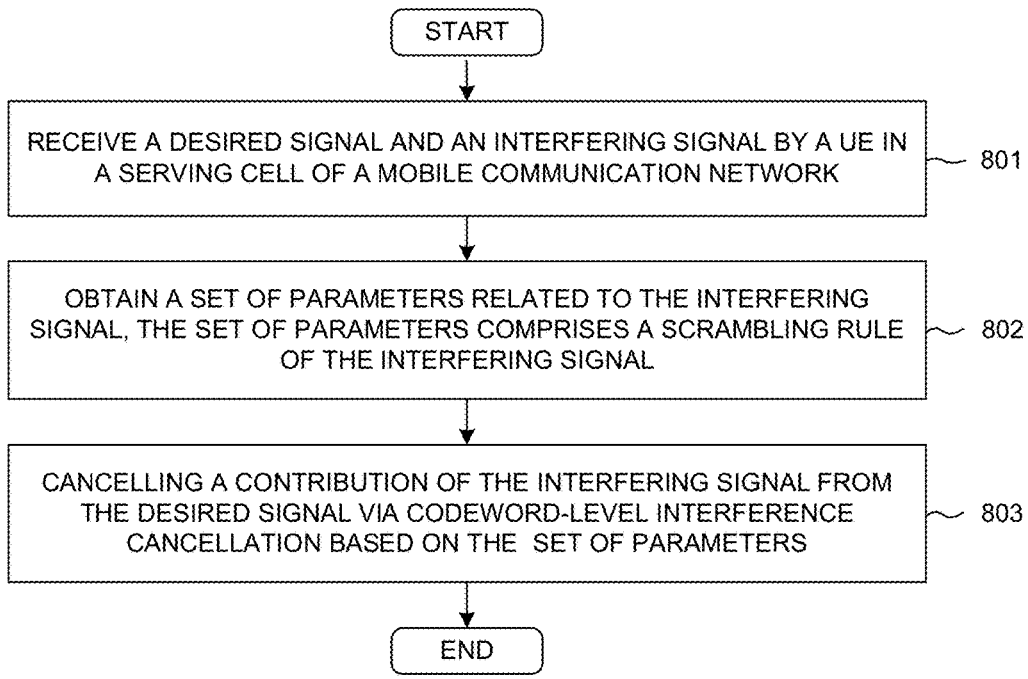
FIG. 8 is a flow chart of a method of CWIC with network assistance from UE perspective in accordance with one novel aspect.

FIG. 8 is a flow chart of a method of CWIC with network assistance from UE perspective in accordance with one novel aspect. In step 801, a user equipment receives a desired radio signal and an interfering radio signal in a serving cell of a mobile communication network. In step 802, the UE obtains a set of parameters related to the interfering signal, and the set of parameters comprises a scrambling rule of the interfering signal. The scrambling rule is based on a sequence that is either cell-specific or configured by the network. In step 803, the UE cancels a contribution of the interfering signal from the desired signal via codeword level interference cancellation based on the set of parameters. In one embodiment, the set of parameters further comprises resource allocation information of the interfering signal.

Figure 9:
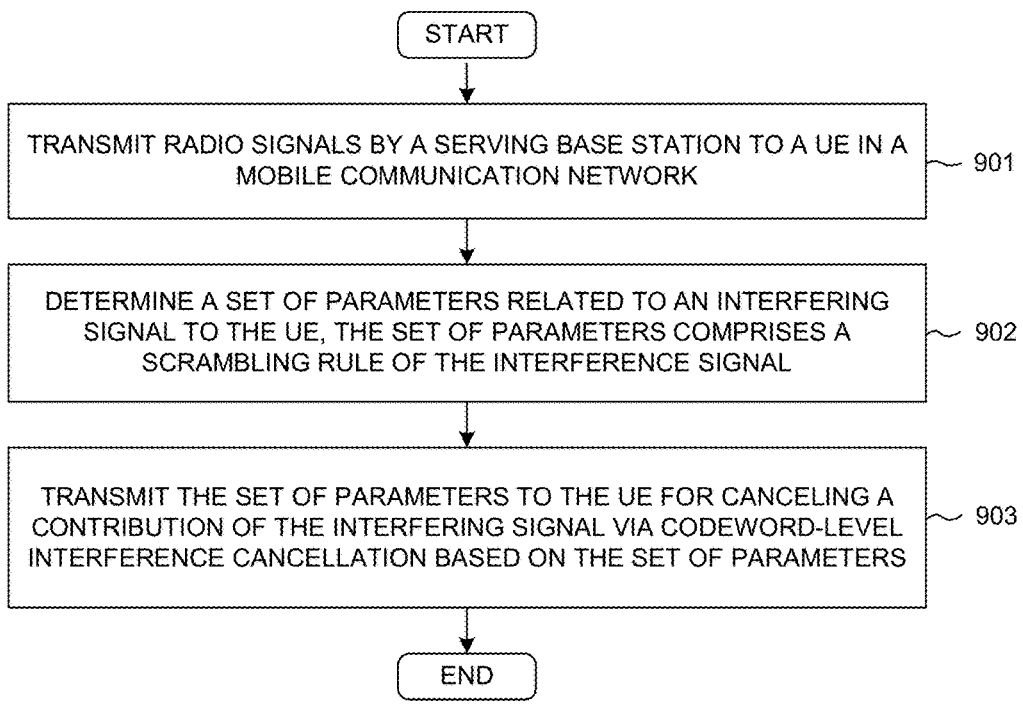
FIG. 9 is a flow chart of a method of CWIC with network assistance from eNB perspective in accordance with one novel aspect.

FIG. 9 is a flow chart of a method of CWIC with network assistance from eNB perspective in accordance with one novel aspect. In step 901, a serving base station transmits radio signals to a user equipment (UE) in a mobile communication network. In step 902, the serving base station determines a set of parameters related to an interfering signal to the UE, the set of parameters comprises a scrambling rule of the interfering signal. The scrambling rule is based on a sequence that is either cell-specific or based on value(s) configured by the serving base station. In step 903, the serving base station transmits the set of parameters to the UE such that the UE is able to cancel a contribution of the interfering signal via codeword level interference cancellation based on the set of parameters.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving a desired signal and an interfering signal by a user equipment (UE) in a serving cell of a mobile communication network;
   obtaining a set of parameters related to the interfering signal, wherein the set of parameters comprises a first scrambling rule for de-scrambling the interfering signal, wherein the first scrambling rule is based on a sequence that is either cell-specific or configured by the network; and
   cancelling a contribution of the interfering signals from the desired signals via codeword-level interference cancellation (CWIC) based on the set of parameters, wherein the UE descrambles a physical downlink control channel (PDCCH) for control information using a second scrambling rule associated with a UE-specific identity, and wherein the UE descrambles a physical downlink shared channel (PDSCH) for data information using the first scrambling rule.

2. The method of claim 1, wherein the set of parameters further comprises resource allocation information of the interfering signal.

3. The method of claim 2, wherein the resource allocation information comprises overlapping physical resource blocks (PRBs) allocated to both the interfering signal and the desired signal.

4. A user equipment (UE), comprising:
   a receiver that receives a desired signal and an interfering signal by a user equipment (UE) in a serving cell of a mobile communication network;
   a control circuit that obtains a set of parameters related to the interfering signal, wherein the set of parameters comprises a first scrambling rule for de-scrambling the interfering signal, wherein the first scrambling rule is based on a sequence that is either cell-specific or configured by the network; and
   an interference cancellation (IC) circuit that cancels a contribution of the interfering signals from the desired signals via codeword-level interference cancellation (CWIC) based on the set of parameters, wherein the UE descrambles a physical downlink control channel (PDCCH) for control information using a second scrambling rule associated with a UE-specific identity, and wherein the UE descrambles a physical downlink shared channel (PDSCH) for data information using the first scrambling rule.

5. The UE of claim 4, wherein the set of parameters further comprises resource allocation information of the interfering signal.

6. The UE of claim 5, wherein the resource allocation information comprises overlapping physical resource blocks (PRBs) allocated to both the interfering signal and the desired signal.

7. A method, comprising:
   transmitting radio signals by a serving base station (eNB) to a user equipment (UE) in a mobile communication network;
   determining a set of parameters related to an interfering signal to the UE, wherein the set of parameters comprises a first scrambling rule of the interfering signal, wherein the first scrambling rule is based on a sequence that is either cell-specific or configured by the network; and
   transmitting the set of parameters to the UE for the UE for cancelling a contribution of the interfering signal via codeword-level interference cancellation (CWIC) based on the set of parameters, wherein the base station scrambles a physical downlink control channel (PDCCH) using a second scrambling rule associated with a UE-specific identity for control information transmission, and wherein the base station scrambles a physical downlink shared channel (PDSCH) using the first scrambling rule for data information transmission.

8. The method of claim 7, wherein the set of parameters further comprises resource allocation information of the interfering signal.

9. The method of claim 8, wherein the resource allocation information comprises overlapping physical resource blocks (PRBs) allocated to both the interfering signal and the desired signal.

10. The method of claim 9, wherein the resource allocation information comprises a continuous superset of the overlapping PRBs.

11. The method of claim 8, wherein the resource allocation information is jointly signaled with other parameters of the set of parameters.

* * * * *